(No Model.) 4 Sheets—Sheet 1.

E. W. BLISS.
CAN CRIMPING, ACIDING, AND SOLDERING MACHINE.

No. 307,086. Patented Oct. 28, 1884.

Attests:
J. H. Templin.
F. Rudolph.

Inventor.
E. W. Bliss (No Model.) 4 Sheets—Sheet 2.
E. W. BLISS.
CAN CRIMPING, ACIDING, AND SOLDERING MACHINE.
No. 307,086. Patented Oct. 28, 1884.
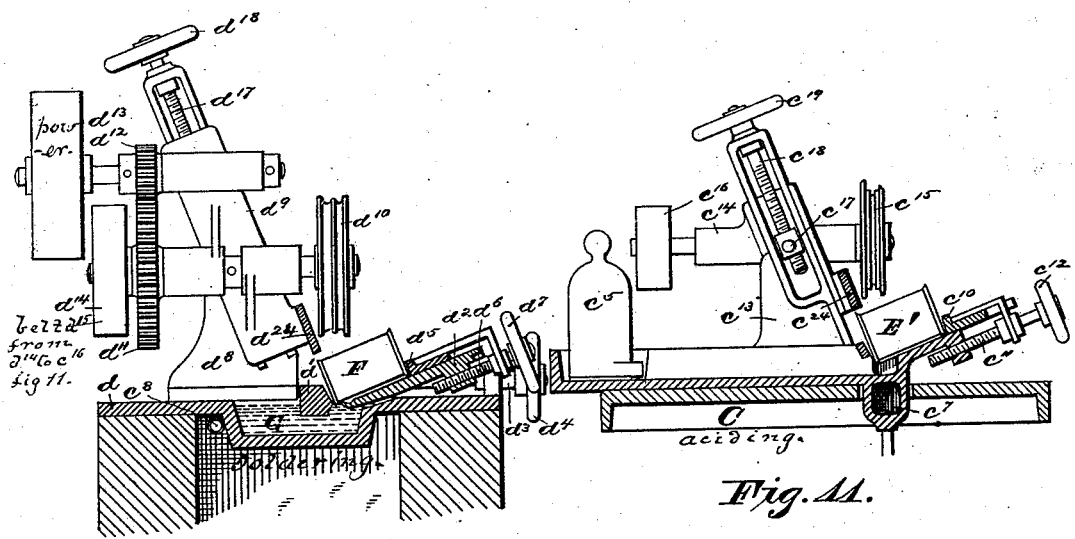
Fig. 11.
Fig. 16.
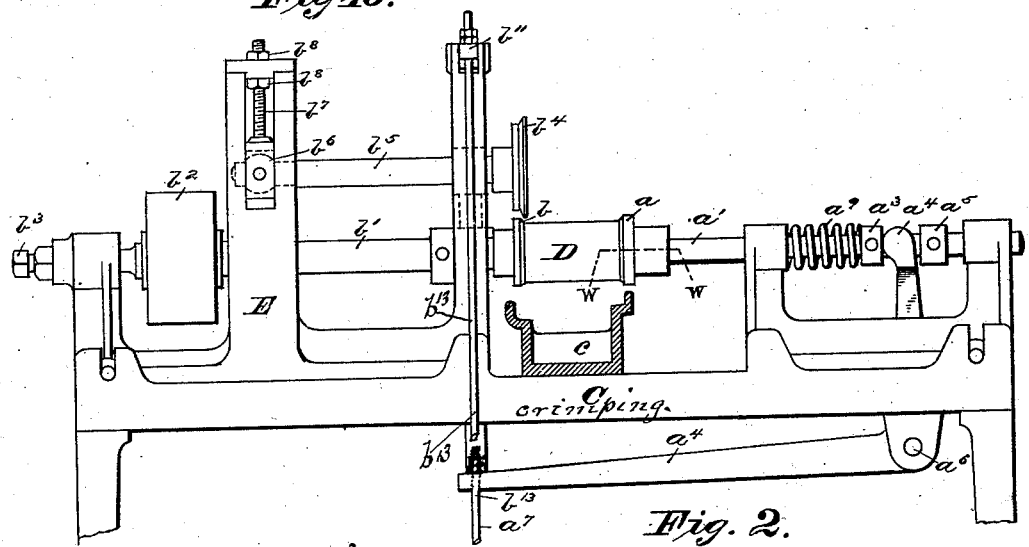
Fig. 2.
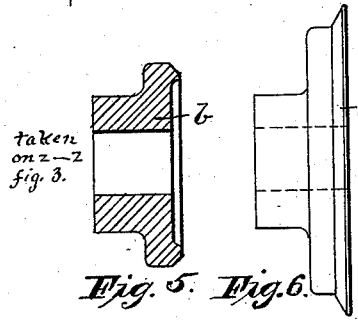
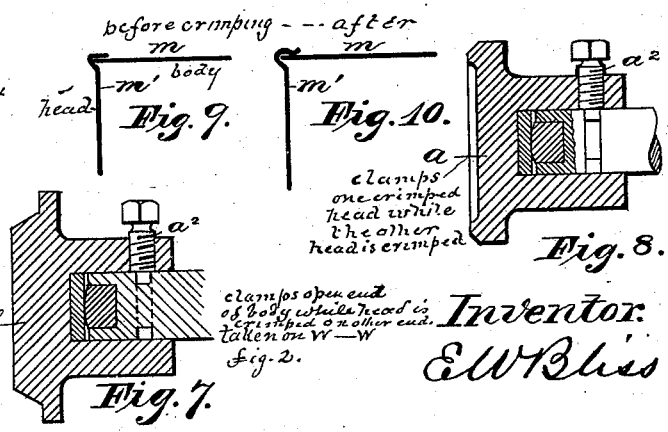
Attests.
J. H. Templin
F. Rudolph.
Inventor.
E W Bliss (No Model.) 4 Sheets—Sheet 3.

E. W. BLISS.
CAN CRIMPING, ACIDING, AND SOLDERING MACHINE.

No. 307,086. Patented Oct. 28, 1884.

Attests:
J. H. Templin
F. Rudolph

Inventor:
E W Bliss (No Model.) 4 Sheets—Sheet 4.
E. W. BLISS.
CAN CRIMPING, ACIDING, AND SOLDERING MACHINE.
No. 307,086. Patented Oct. 28, 1884.
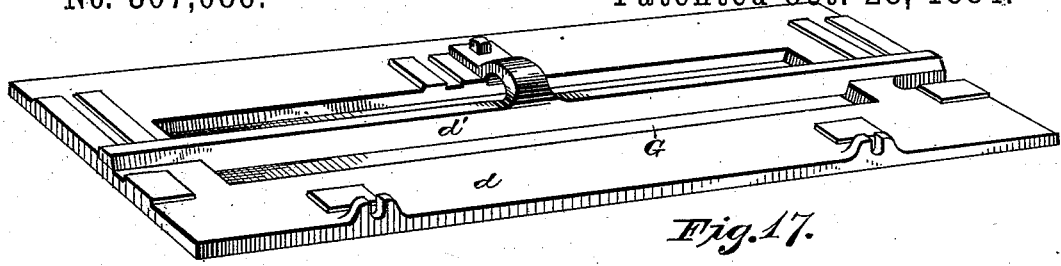
Fig. 17.
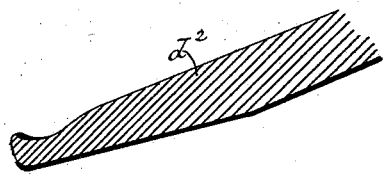
Fig. 18.
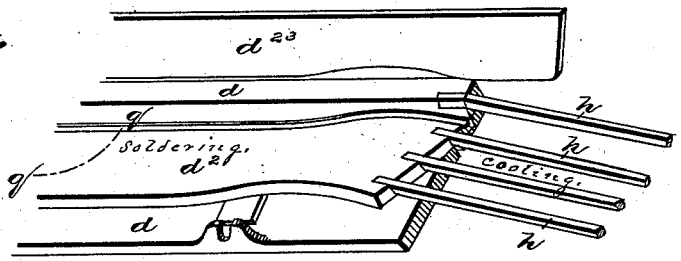
Fig. 19.
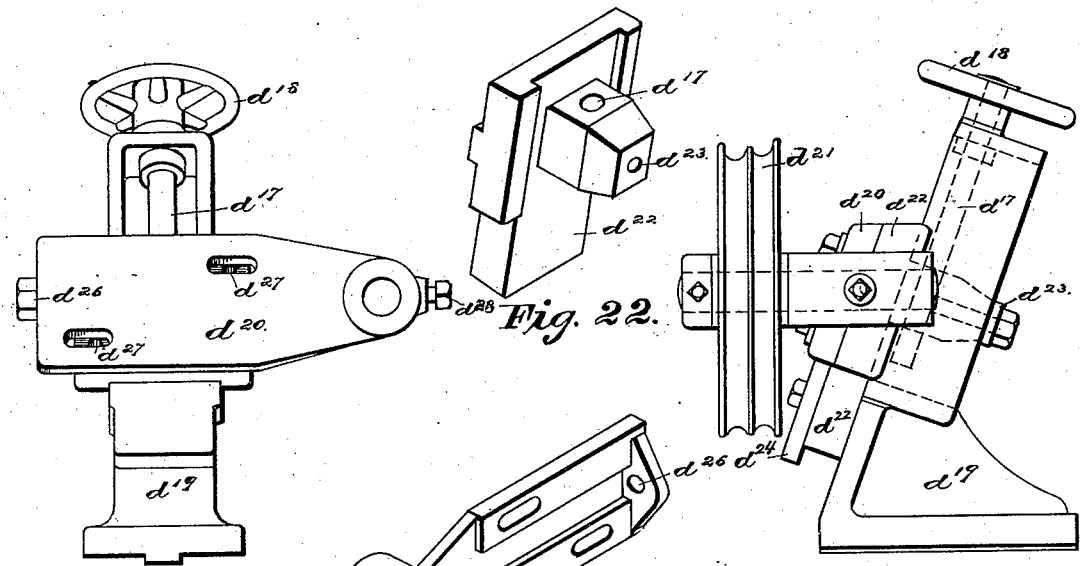
Fig. 20. Fig. 23. Fig. 21.
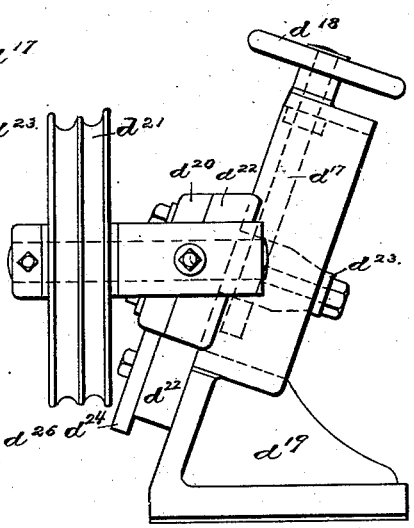
Attests.
J. H. Templin.
F. Rudolph.
Inventor.
E W Bliss.

UNITED STATES PATENT OFFICE.

ELIPHALET W. BLISS, OF BROOKLYN, NEW YORK.

CAN CRIMPING, ACIDING, AND SOLDERING MACHINE.

SPECIFICATION forming part of Letters Patent No. 307,086, dated October 28, 1884.

Application filed February 26, 1884. (No model.)

*To all whom it may concern:*

Be it known that I, ELIPHALET W. BLISS, of the city of Brooklyn, in the county of Kings and State of New York, have invented a new and useful Improvement in Can Crimping, Aciding, and Soldering Machines, of which the following is a specification.

My improvement relates to an improved mechanism for crimping the end seams of circular sheet-metal cans, the mechanism for applying the acid to the crimped seam preparatory to soldering the seams, and the mechanism for soldering the crimped seam in a single continuous operation, by the means hereinafter more fully described and claimed.

Figure 1:
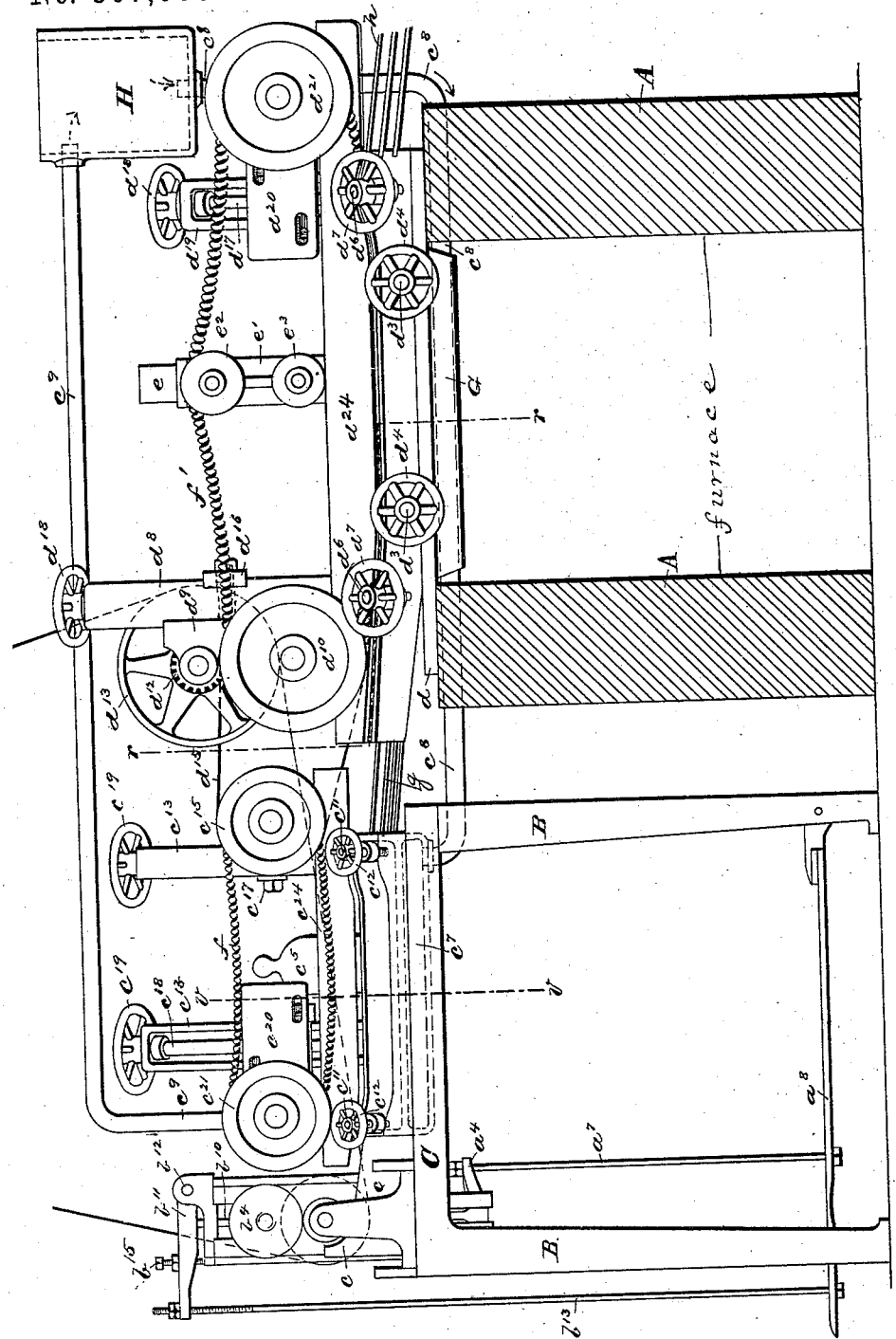
Figure 12:
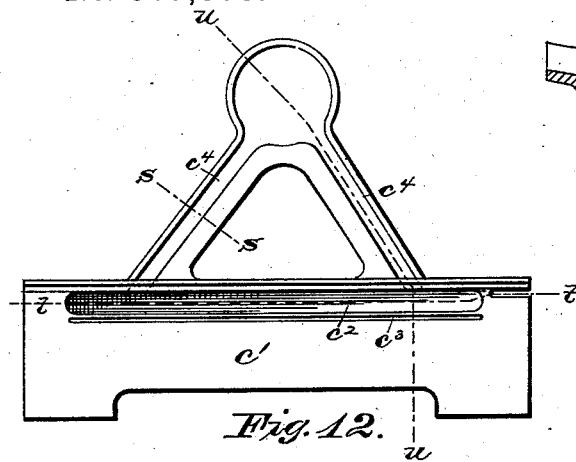
Figure 14:
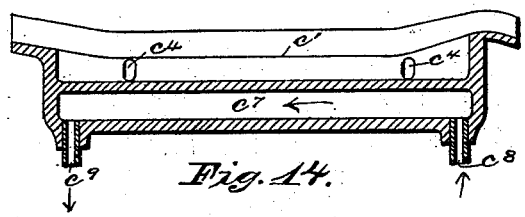
Figure 15:
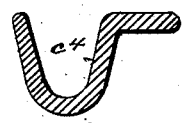
Figure 13:
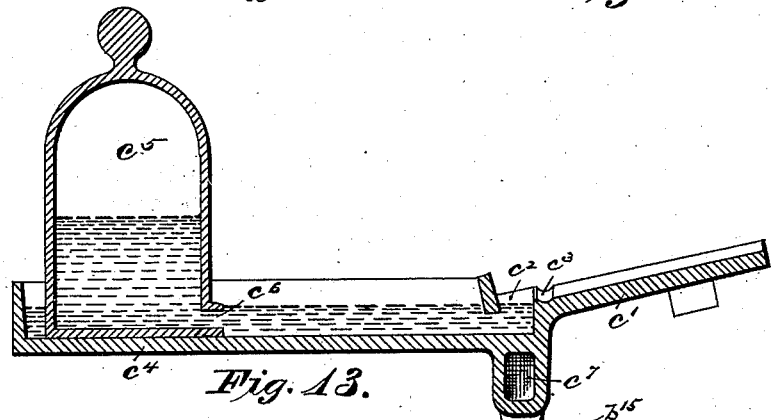
Figures 3, 4:
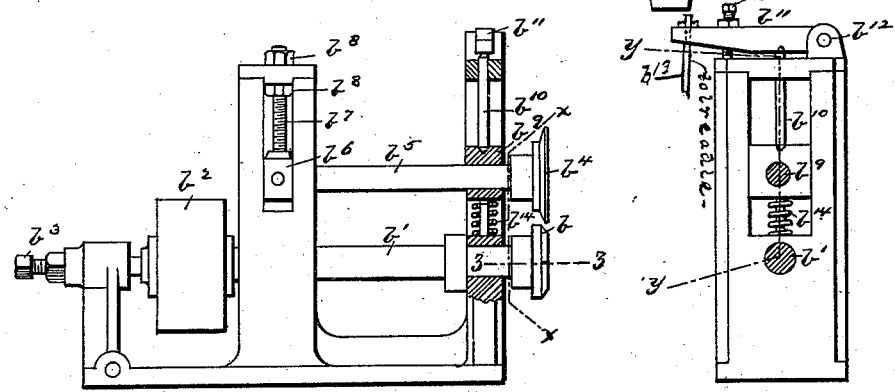

Figure 1 is a front elevation of my combined crimping, aciding, and soldering machine, combined and arranged for crimping, aciding, and soldering the end seams of circular cans in a continuous operation. Fig. 2 is a side elevation of my improved crimping-machine, showing a can in position between the centering and clamping disks, ready to have the end seam crimped. Fig. 3 is a side view of the head-stock of the crimper and a partial section through line $y\ y$, Fig. 4. Fig. 4 is an end view of the head-stock, Fig. 3, omitting crimping-rolls, taken at line $x\ x$ of the last-named figure. Fig. 5 is a longitudinal section of a centering and clamping disk for centering and clamping the end of the can when the seam is being crimped on the can-body, taken at line $z\ z$, Fig. 3. Fig. 6 represents an edge view of a crimping-roll. Fig. 7 is a longitudinal section of a centering and clamping disk to be used in supporting and centering the open end of the can-body when the first end is being crimped on the body, taken at line $w\ w$, Fig. 2. Fig. 8 is a longitudinal section of a centering and clamping disk to be used in centering and clamping the can-body when the second end seam is being crimped to the can-body, taken through same line as Fig. 7. Fig. 9 is a longitudinal section of a part of the can-body and end, showing the seam before it is crimped. Fig. 10 is the same view after the seam is crimped. Fig. 11 is a cross-section of the acid-machine, taken through line $v\ v$, Fig. 1. Fig. 12 is a plan view of the acid-trough and the machine on which the cans roll. Fig. 13 is a cross-section of Fig. 12, taken through line $u\ u$, with the acid-tank in the trough. Fig. 14 represents a longitudinal section of Fig. 12, through line $t\ t$. Fig. 15 is a cross-section through one of the grooves, taken at line $s\ s$, Fig. 12. Fig. 16 is a cross-section of the soldering-machine through line $r\ r$, Fig. 1. Fig. 17 represents a perspective view of the solder-bed and back gage. Fig. 18 is a section of a part of the adjustable incline, taken at line $q\ q$, Fig. 19. Fig. 19 is a perspective view of a part of the depressed incline, the solder-bed, back gage, belt-guard, and adjustable cooling-chute, showing their relative positions. Fig. 20 represents a front view of an inclined bracket for supporting the adjustable belt carrying the sheave-arm. Fig. 21 is a side view of the same, showing the sheave in position and the mechanism for vertically adjusting the same. Fig. 22 represents a perspective view of a slide by means of which the vertical adjustment of the belt-carrying sheave is effected. Fig. 23 is a perspective view of adjustable arm or portion of the bracket by which the belt-carrying sheave is supported and a lateral adjustment is secured to more perfectly adjust the tension of the belt, and to carry the can out of the solder onto the cooling-chute.

Having described my invention in reference to the figures illustrated in the accompanying drawings, I will now proceed to describe it by reference to the letters marked thereon, in which similar letters of reference refer to corresponding parts throughout the several views.

A represents walls of the furnace under the soldering-machine.

B represents the legs supporting the bed of the crimping and aciding machine.

C represents the bed of the crimping and aciding machine.

$a$ represents an intermittently-revolving centering and clamping disk attached to shaft $a'$, having suitable bearings on bed C, and held in place on the shaft by screw $a^2$, Fig. 8, extended into a groove on the shaft, and adapted to revolve on the shaft when in contact with the can. The shaft $a$ has a reciprocating motion by means of the mechanism hereinafter described.

$a^3$ is a collar on shaft $a'$, to receive the thrust of lever $a^4$.

$a^5$ represents an adjusting-collar on shaft $a'$, to adjust the outward motion of the shaft.

$a^4$ represents a bell-crank lever pivoted to the bed at $a^6$, Fig. 2.

$a^7$ is a connecting-rod attached to the long arm of the bell-crank $a^4$, and the opposite end of the connecting-rod is attached to treadle $a^8$, Fig. 1, which is pivoted to a leg under the aciding-machine.

By the mechanism described a horizontal inward motion may be imparted to the shaft at the will of the operator. An outward motion is imparted to the shaft carrying the centering and clamping disk by coiled spring $a^9$ on the shaft.

$a^{10}$, Fig. 7, is a centering and clamping disk used in crimping the first end on the can-body.

$b$ is a revolving centering and clamping disk, which centers, clamps, and revolves the can-body when the same is engaged by the operator when the seam is being crimped. The disk is rigidly attached on the end of the shaft $b'$, which is supported in suitable bearings in head-stock E. (Shown in Figs. 2 and 3.)

$b^2$ is a driving-pulley secured to shaft $b'$.

$b^3$ is a set-screw to adjust and take the end-thrust of the shaft $b'$.

$b^4$ represents a crimping-roll on shaft $b^5$, adapted to revolve when brought in contact with the seam of a revolving can.

$b^6$ is an adjustable sliding bearing for shaft $b^5$. The bearing is adjustable to accommodate different sizes of cans and to allow the vertical motion of the crimping-roll.

$b^7$ is an adjusting-screw, adjustable by nuts $b^8 b^8$.

$b^9$, Fig. 3, is a sliding bearing for shaft $b^5$, working in a slot in the head-stock.

$b^{10}$ represents a pin, the lower end resting on sliding bearing $b^9$, and the upper end resting under lever $b^{11}$.

$b^{12}$, Fig. 4, is a lever pivoted to the top of the head-stock and resting on the upper end of pin $b^{10}$. The opposite end of the lever is connected with treadle $a^8$ by means of connecting-rod $b^{13}$, Fig. 1. The crimping-roll is brought downward in contact with the seam on the revolving can by pressure on the treadle. An upward motion is given to the roll when the pressure on the treadle is removed by spring $b^{14}$, Fig. 4.

$b^{15}$ represents an adjusting-screw to regulate the pressure on the crimping-roll.

D is a can between the centering and clamping disks in position to have the end seam crimped.

$c$, Fig. 2, represents a section of an inclined chute attached to the bed in position to receive and carry the can under the belt of the aciding-machine, when crimped and released from the centering and clamping disks. The front end of this chute forms a support on which the can-body is placed before the same is centered and clamped between the disks, as shown in Fig. 1.

$c'$, Figs. 12 and 14, represents an inclined depressed way on which the cans roll. This incline rests on bed C, and is depressed in the longitudinal center to allow the end seam of a can to dip in the acid.

$c^2$ represents a groove at the bottom of the incline, for the reception of acid or other fluid flux.

$c^3$ is a corrugated depression at the bottom of the incline, to prevent the acid or flux from getting on the can-body.

$c^4 c^4$ represent grooves leading from groove $c^2$ to the acid-fountain.

$c^5$ is a self-feeding reservoir with a small aperture at the bottom constructed air-tight when partly or wholly filled with acid or liquid flux. The acid is self-feeding. When the supply in the grooves is reduced below the upper edge of the opening in the fountain, air is admitted and the acid is discharged, the same being retained and fed by atmospheric pressure.

$c^6$ represents the mouth of the acid fountain or reservoir.

$c^7$ is a heating-chamber.

$c^8$ represents the feeding or inlet pipes, and $c^9$ the outlet-pipe. The same are provided to receive and discharge steam or hot water for heating the acid.

$c^{10}$, Fig. 11, is an adjustable gage.

$c^{11} c^{11}$, Figs. 1 and 11, represent adjusting-screws.

$c^{12} c^{12}$ represent hand-wheels to work the adjusting-screws.

$c^{13} c^{13}$ represent inclined brackets for carrying the belt supporting and driving sheaves.

$c^{14}$ is a vertically-adjustable bearing for carrying the driving sheave and pulley, held in place on the bracket by a clamp and bolt, $c^{17}$.

$c^{15}$ represents the sheave, and $c^{16}$ the driving-pulley, both attached to a short shaft.

$c^{18} c^{18}$ are screws for vertically adjusting the sheave and pulley, operated by hand-wheels $c^{19} c^{19}$.

In Fig. 1, $c^{20}$ is an adjustable arm for vertically and laterally adjusting the sheave, held in place and adjustable in the same manner as at $d^{20}$, Fig. 20, as hereinafter more fully described.

$c^{21}$ represents a sheave running loosely on arm $c^{20}$ for supporting the belt $f$.

$c^{24}$ represents a belt-guard secured to the bearings $c^{14}$ and $c^{20}$, and adjustable with them. The adjustable arm may be changed to the opposite bracket and the driving sheave and pulley placed on either bracket without interfering with my invention.

E' represents a can passing through the aciding-machine, and $f$ represents the belt running on the sheaves to roll the cans through the acid bath.

$d$ represents the bed of the soldering-machine, and G represents a depression forming the solder bath in the bed.

$d'$ is the back gage against which the ends of the cans roll when being soldered.

$d^2$ is the adjustable depressed inclined way or track, so shaped as to allow the end seams of cans to dip into the molten solder when rolling on the way or track with the ends against the back gage, $d'$, when being soldered, and to carry the same, when soldered, out onto the cooling-chute.

$d^2$ $d^3$ represent adjusting-screws, operated by hand-wheels $d^4$ $d^4$, for horizontally adjusting the incline to regulate the dip of the seam in the solder.

$d^5$ is an adjustable gage for keeping the cans in position when being soldered.

$d^6$ $d^6$ represent adjusting-screws, operated by hand-wheels $d^7$ $d^7$, for adjusting the gage $d^5$.

$d^8$ represents an inclined bracket for supporting one of the sheaves and the driving mechanism.

$d^9$, Fig. 6, is the vertically-adjustable bearing which carries the driving pulley and sheave.

$d^{10}$ is a sheave attached rigidly to a short shaft, to the opposite end of which is attached the driving gear-wheel $d^{11}$.

$d^{12}$ is a pinion meshing with the gear-wheel $d^{11}$.

$d^{13}$ is the driving-pulley by means of which power is transmitted to sheave $d^{10}$, carrying one fold of the endless belt.

$d^{14}$, Fig. 16, is a driving-pulley by means of which power is transmitted by belt $d^{15}$, Fig. 1, to pulley $c^{16}$, Fig. 11, driving the belt of the aciding-machine.

$d^{15}$, Fig. 1, represents the belt.

$d^{16}$, Fig. 1, is a clamp and bolt for clamping the adjustable bearing $d^9$ to the bracket $d^8$.

$d^{17}$ is an adjusting-screw, operated by hand-wheel $d^{18}$, for vertically adjusting the sheave and connecting mechanism.

$d^{19}$ is an inclined bracket for supporting the vertically and laterally adjustable arm $d^{20}$, for adjusting the height and tension of the belt, and to extend the sheave carrying the belt a sufficient distance over the end of the incline to enable the belt to carry the cans out of the depressed portion of the inclined track onto the adjustable cooling-chute.

$d^{20}$ is the vertically and laterally adjustable arm carrying the sheave $d^{21}$.

$d^{22}$, Fig. 22, represents a vertically-adjustable slide, to which arm $d^{20}$ is attached. This slide moves in ways in the inclined bracket, and is held in place by a clamp and bolt, $d^{23}$. This slide is vertically adjustable by screw $d^{17}$, operated by wheel $d^{18}$.

$d^{26}$ represents an adjusting-screw by means of which the lateral adjustment of arm $d^{20}$ is secured.

$d^{27}$ $d^{27}$, Fig. 20, represent slots and bolt-holes for securing and adjusting arm $d^{20}$ to the bracket.

$d^{24}$ represents a belt-guard secured to and adjustable with bearings $d^9$ and $d^{22}$.

$d^{28}$ represents a screw for securing the bearing for the sheave in the arm.

$e$ represents an inclined bracket, to which an adjustable slide, $e'$, carrying rollers $e^2$ and $e^3$, are attached in such a manner as to revolve. Idler $e^2$ carries the upper fold of the belt, and idler $e^3$ carries the lowest fold of the belt when the operator desires to remove the same from the solder bath or cans.

$f'$ represents an endless friction-belt, running on sheaves $d^{10}$ and $d^{21}$, which rolls the cans through the solder bath out onto the adjustable cooling-chute.

F represents a can in position to be soldered.

$g$ represents an inclined connecting-way, to guide and carry the cans from the discharge end of the aciding-machine to the receiving end of the soldering-machine under the driving-belt.

H represents a tank with which pipes $c^8$ and $c^9$ are connected. This tank may be supplied with water. The pipe $c^8$, passing through the furnace, will thereby heat the water, creating a circulation, producing the required heat for the acid bath.

$h$ is an adjustable inclined cooling-chute for guiding, conveying, and cooling the solder in the soldered seam, and is adjustable with incline $d^2$.

$m\ m$, Figs. 9 and 10, represent a section of a can-body, and $m'\ m'$ sections of the heads, showing the seam in Fig. 9 before it is crimped, and in Fig. 10 after the seam is crimped.

Having described my invention in reference to the figures illustrated in the accompanying drawings and by the letters marked thereon, I will now proceed to describe its operation.

Power is applied to the driving-pulleys. The operator then places a can with the end or ends on the body on the gage formed by the forward end of chute $c$, between the centering and clamping disks. He then presses the treadle with his foot, bringing the centering and clamping disks in contact with the ends of the can, thereby revolving the same. By increased pressure on the treadle the crimping-roll is brought down upon the end seam of the revolving can, thereby crimping the same. The operator removes the pressure from the treadle as soon as the seam is sufficiently crimped. The can drops upon the inclined chute, and rolls down by its own gravity under the endless belt of the aciding-machine, which rolls the same along the incline with the end seam submerged in acid, out onto the inclined way, where the can by its own gravity rolls under the endless belt of the soldering-machine, which rolls the can along on the inclined way with the end seam submerged in molten solder. The can is rolled by the endless belt of the soldering-machine onto the inclined cooling-chute, where the can rolls a sufficient distance to cool the soldered seam. The cans, after having been once put through the machines to seam one end, are again put through to seam the opposite end.

What I claim as new, and desire to secure by Letters Patent, is—

1. In an aciding-machine having a depressed incline way on which the cans roll, an acid bath at the bottom of the incline in which the end seams of the cans roll, one or more grooves to conduct the acid from the fountain to the bath, an automatically-feeding fountain to automatically feed the acid to the bath, two or more inclined brackets for carrying two or more adjustable sheaves, one or more laterally-adjustable arms for supporting and adjusting the sheaves, one or more driving-sheaves, and an endless friction-belt moving on the sheaves, arranged and combined substantially as stated.

2. The combination, in an aciding-machine for applying heated acid to the end of circular cans, of a heating-chamber in contact with an acid bath provided with an inlet and an outlet pipe connected with a hot-water tank for circulating the heated water therein, for heating the acid, combined and arranged as described.

3. In an organized machine for crimping, aciding, and soldering the ends of circular sheet-metal cans, the following combinations and elements: a reciprocating rotating, centering, and clamping disk; a rotating, centering, and clamping disk; an intermittingly-revolving crimping-blade provided with suitable means for closing the crimper-blade upon the end seam of the circular can when the seam is rotated as described, and to release the can when the seam is crimped; a gage to support the can; an incline way to receive the can when crimped and conduct the same under the belt of the aciding-machine; an incline on which the cans roll; an acid bath at the bottom of the incline, into which the crimped seam of the can rolls; one or more grooves to conduct the acid from the fountain to the bath; an automatically-feeding fountain to automatically supply acid to the bath; two or more incline brackets for carrying and supporting two or more adjustable sheaves; one or more laterally-adjustable arms for supporting and adjusting a sheave or sheaves; one or more driving-sheaves; an endless friction-belt moving on the sheaves to rotate the cans through the acid bath onto the incline way; an incline on which the cans roll from the acid bath under the belt of the soldering-machine; a solder bath; an incline way on which the cans roll from the acid; a stationary back gage against which the ends of the cans rest when being soldered, with the end seam dipping in the molten solder; two or more inclined brackets for supporting two or more adjustable sheaves; two or more adjustable sheaves provided with means for vertically adjusting the same; one or more adjustable arms for carrying one or more adjustable sheaves for adjusting the belt; one or more belt-propelling sheaves to move the belt, and an endless friction-belt moving on the sheaves to rotate the cans, combined and arranged as described, for the purposes stated.

E. W. BLISS.

Witnesses:
JNO. L. DIBBLE,
WM. G. WILLS.